(12) United States Patent
Philipp

(10) Patent No.: US 9,551,904 B2
(45) Date of Patent: Jan. 24, 2017

(54) TOUCHSCREEN ELECTRODE CONFIGURATION

(71) Applicant: Harald Philipp, Zug (CH)

(72) Inventor: Harald Philipp, Zug (CH)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/094,370

(22) Filed: Dec. 2, 2013

(65) Prior Publication Data

US 2014/0293154 A1 Oct. 2, 2014

Related U.S. Application Data

(63) Continuation of application No. 12/608,779, filed on Oct. 29, 2009, now Pat. No. 8,599,150.

(51) Int. Cl.
| | |
|---|---|
| *G06F 3/041* | (2006.01) |
| *G02F 1/1343* | (2006.01) |
| *G06F 3/044* | (2006.01) |
| *G02F 1/1333* | (2006.01) |
| *G06F 1/16* | (2006.01) |

(52) U.S. Cl.
CPC ..... *G02F 1/134309* (2013.01); *G02F 1/13338* (2013.01); *G02F 1/13439* (2013.01); *G06F 1/169* (2013.01); *G06F 3/041* (2013.01); *G06F 3/044* (2013.01); *G06F 2203/04112* (2013.01)

(58) Field of Classification Search
CPC  G06F 2203/04112; G06F 3/041; G06F 3/045; G06F 17/00; G06F 19/00; G06F 7/20; G09G 5/00; H04M 1/00; B44C 1/22; H05K 3/30; B05D 5/12; B23B 37/00

USPC ........................................................ 345/173
See application file for complete search history.

(56) References Cited

U.S. PATENT DOCUMENTS

| | | |
|---|---|---|
| 7,663,607 B2 | 2/2010 | Hotelling |
| 7,864,503 B2 | 1/2011 | Chang |
| 7,875,814 B2 | 1/2011 | Chen et al. |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |

(Continued)

FOREIGN PATENT DOCUMENTS

| | | |
|---|---|---|
| CN | 101324827 | 12/2008 |
| CN | 1940843 A | 7/2011 |

(Continued)

OTHER PUBLICATIONS

U.S. Appl. No. 13/288,385, filed Nov. 3, 2011, Yilmaz.

(Continued)

*Primary Examiner* — Ilana Spar
*Assistant Examiner* — Nguyen H Truong
(74) *Attorney, Agent, or Firm* — Baker Botts L.L.P.

(57) ABSTRACT

A touchscreen includes touchscreen electrode elements distributed across an active area of a substrate, and the touchscreen overlays a display. The touchscreen electrode elements are configured to avoid creating moiré patterns between the display and the touchscreen, such as angled, wavy, zig-zag, or randomized lines. In a further example, the electrodes form a mesh pattern configured to avoid moiré patterns.

20 Claims, 7 Drawing Sheets

(56) References Cited

U.S. PATENT DOCUMENTS

| | | |
|---|---|---|
| 8,179,384 B2 | 5/2012 | Sakashita |
| 8,217,902 B2 | 7/2012 | Chang |
| 8,599,150 B2 | 12/2013 | Philipp |
| 8,723,824 B2 | 5/2014 | Myers |
| 2002/0186210 A1 | 12/2002 | Itoh |
| 2008/0117186 A1 | 5/2008 | Wang |
| 2008/0309635 A1 | 12/2008 | Matsuo |
| 2009/0153502 A1 | 6/2009 | Jiang |
| 2009/0184940 A1 | 7/2009 | Silk et al. |
| 2009/0218310 A1 | 9/2009 | Zu et al. |
| 2009/0219258 A1* | 9/2009 | Geaghan et al. ............ 345/173 |
| 2009/0273577 A1* | 11/2009 | Chen et al. .................. 345/174 |
| 2009/0315854 A1 | 12/2009 | Matsuo |
| 2010/0026664 A1 | 2/2010 | Geaghan |
| 2010/0028811 A1 | 2/2010 | Geaghan |
| 2010/0045614 A1 | 2/2010 | Gray et al. |
| 2010/0079387 A1 | 4/2010 | Rosenblatt |
| 2010/0328228 A1 | 12/2010 | Elias |
| 2011/0032193 A1 | 2/2011 | Szalkowski |
| 2011/0095996 A1 | 4/2011 | Yilmaz |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

FOREIGN PATENT DOCUMENTS

| | | |
|---|---|---|
| JP | 2006/344163 A | 12/2006 |
| JP | 2008-145998 | 6/2008 |
| TW | 243670 | 9/2004 |
| TW | 200810511 | 2/2008 |
| TW | 344522 | 11/2008 |
| WO | WO 2012/129247 | 9/2012 |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
Office Action for U.S. Appl. No. 13/312,702, Mar. 6, 2012.
Office Action for U.S. Appl. No. 13/408,762, May 9, 2012.
Office Action for U.S. Appl. No. 13/408,762, Sep. 7, 2012.
"2009—Conductive Inkjet Technology," [online][retrieved Apr. 20, 2010]. Retrieved from the Internet: <URL: http://www.condutiveinkjet.com/about-us/latest-news/2009.aspx>, 1 page.
"Cambrios Technologies Corporation Awarded Department of Defense Contract for Flexible Solar Cells," [online][retrieved Apr. 20, 2010]. Retrieved from the Internet: <URL: http://www.cambrios.com/200/DOD_Release.htm> (Apr. 12, 2010) 2 pages.
"New Silver Conductive Inks Target High-Growth Touch Screen and OLED Markets," [online][retrieved Apr. 20, 2010]. Retrieved from the Internet: <URL: http://www2.dupont.com/MCM/en_US/news_events/article20100413.html> (Apr. 23, 2010) 3 pgs.
"Printing of Antennas and Flexible Circuits," *Core Applications & Technologies*, (c) 2009 Conductive Inkjet Technology Ltd., (Oct. 2009) 23 pages.
Horteis, M. et al., "Fine Line Printed and Plated Contacts on High OHMIC Emitters Enabling 20% Cell Efficiency," *2009 34th IEEE Photovoltaic Specialists Conference (PVSC)*, (2009), 000060-000065.
Chinese First Office Action Issued by State Intellectual Property Office regarding Patent Application No. 2010/10530428.9 issued May 28, 2014 (English translation received Jul. 16, 2014), Reported Jun. 9, 2014.
H. Philipp, U.S. Appl. No. 12/608,779, Non-final Rejection dated Jan. 3, 2012.
H. Philipp, U.S. Appl. No. 12/608,779, Amendment dated May 3, 2012.
H. Philipp, U.S. Appl. No. 12/608,779, Final Office Action dated Jun. 6, 2012.
H. Philipp, U.S. Appl. No. 12/608,779, Request for Continued Exam. dated Sep. 6, 2012.
H. Philipp, U.S. Appl. No. 12/608,779, Non-Final Rejection dated Sep. 27, 2012.
H. Philipp, U.S. Appl. No. 12/608,779, Amendment dated Jan. 28, 2013.
H. Philipp, U.S. Appl. No. 12/608,779, Final Rejection dated Mar. 14, 2013.
H. Philipp, U.S. Appl. No. 12/608,779, RCE dated Jul. 15, 2013.
H. Philipp, U.S. Appl. No. 12/608,779, Non-Final Rejection dated Aug. 1, 2013.
H. Philipp, U.S. Appl. No. 12/608,779, Amendment dated Sep. 26, 2013.
H. Philipp, U.S. Appl. No. 12/608,779, Notice of Allowance dated Oct. 11, 2013.
H. Philipp, U.S. Appl. No. 12/608,779, Issue Notification dated Nov. 13, 2013.
Second Office Action issued by State Intellectual Property Office from PRC (China), issued Feb. 6, 2015, Application No. 2010/10530428.9.
ROC Patent Application 099137313 Office Action dated Sep. 24, 2015 (Chinese version).
ROC Patent Application 099137313 Office Action dated Sep. 24, 2015 (English version).
ROC Patent Application 099137313 Office Action dated Sep. 24, 2015, Abstracts of documents cited in Office Action (English version).

* cited by examiner

TOUCHSCREEN ELECTRODE CONFIGURATION

RELATED APPLICATION

This application is a continuation, under 35 U.S.C. §120, of U.S. patent application Ser. No. 12/608,779, filed Oct. 29, 2009, entitled Touchscreen Electrode Configuration, which is hereby incorporated by reference.

BACKGROUND

Touchscreen displays are able to detect a touch within the active or display area, such as detecting whether a finger is present pressing a fixed-image touchscreen button or detecting the presence and position of a finger on a larger touchscreen display. Some touchscreens can also detect the presence of elements other than a finger, such as a stylus used to generate a digital signature, select objects, or perform other functions on a touchscreen display.

Use of a touchscreen as part of a display allows an electronic device to change a display image, and to present different buttons, images, or other regions that can be selected, manipulated, or actuated by touch. Touchscreens can therefore provide an effective user interface for cell phones, GPS devices, personal digital assistants (PDAs), computers, ATM machines, and other devices.

Touchscreens use various technologies to sense touch from a finger or stylus, such as resistive, capacitive, infrared, and acoustic sensors. Resistive sensors rely on touch to cause two resistive elements overlaying the display to contact one another completing a resistive circuit, while capacitive sensors rely on the capacitance of a finger changing the capacitance detected by an array of elements overlaying the display device. Infrared and acoustic touchscreens similarly rely on a finger or stylus to interrupt infrared or acoustic waves across the screen, indicating the presence and position of a touch.

Capacitive and resistive touchscreens often use transparent conductors such as indium tin oxide (ITO) or transparent conductive polymers such as PEDOT to form an array over the display image, so that the display image can be seen through the conductive elements used to sense touch. The size, shape, and pattern of circuitry have an effect on the accuracy of the touchscreen, as well as on the visibility of the circuitry overlaying the display. Although a single layer of most suitable conductive elements is difficult to see when overlaying a display, multiple layers can be visible to a user, and some materials such as fine line metal elements are not transparent but rely on their small size to avoid being seen by users.

Further, touchscreens are often used to overlay displays such as LCD display screens that have their own circuitry and patterns. It is therefore desirable to consider the configuration of touchscreen electrode patterns when designing a touchscreen.

SUMMARY

A touchscreen includes touchscreen electrode elements distributed across an active area of a substrate, and the touchscreen overlays a display. The touchscreen electrode elements are configured to avoid creating moiré patterns between the display and the touchscreen, such as angled, wavy, zig-zag, or randomized lines. In a further example, the electrodes form a mesh pattern configured to avoid moiré patterns.

DETAILED DESCRIPTION

Touchscreens are often used as interfaces on small electronic devices, appliances, and other such electronic systems because the display behind the touchscreen can be easily adapted to provide instruction to the user and to receive various types of input, thereby providing an intuitive interface that requires very little user training to use effectively. Inexpensive and efficient touchscreen technologies enable incorporation of touchscreens into inexpensive commercial devices, but these inexpensive technologies should also desirably be durable and have relatively high immunity to noise, moisture or dirt, or other unintended operation to ensure reliability and longevity of the touchscreen assembly.

In a typical mutual capacitance touchscreen, the capacitance between drive electrodes and various receive or sense electrodes is monitored, and a change in mutual capacitance between the electrodes indicates the presence and position of a finger. Mutual capacitance sensor circuitry measures the capacitance between the drive electrodes and the receive electrodes, which are covered by a dielectric overlay material that provides a sealed housing. When a finger is present, field coupling between the drive and receive electrodes is attenuated, as the human body conducts away a portion of the field that arcs between the drive and receive electrodes. This reduces the measured capacitive coupling between the drive and receive electrodes. In a self-capacitance touchscreen, an array of a single type of electrode is used to determine position of a touch by monitoring the touch's influence on the self-capacitance of each of the electrodes in the array. The attached circuitry can measure the self capacitance of a single electrode, or of groups of electrodes such as rows and columns of electrodes. In a more detailed example, an amount of charge needed to raise the voltage of the electrode by a predetermined amount is measured, thereby determining the capacitance of each electrode.

When a finger is present, the self-capacitance of the electrode is increased, resulting in a measurable change in self-capacitance.

The touchscreen elements that overlay a display are occasionally formed from conductive materials such as metal wire traces or fine line metal, or more commonly conductors such as Indium tin oxide which are transparent and relatively conductive in thin layers. Other materials such as PEDOT (polyethylene dioxythiophene) and other conductive polymers are also relatively transparent and used in some touchscreens.

Figure 1:
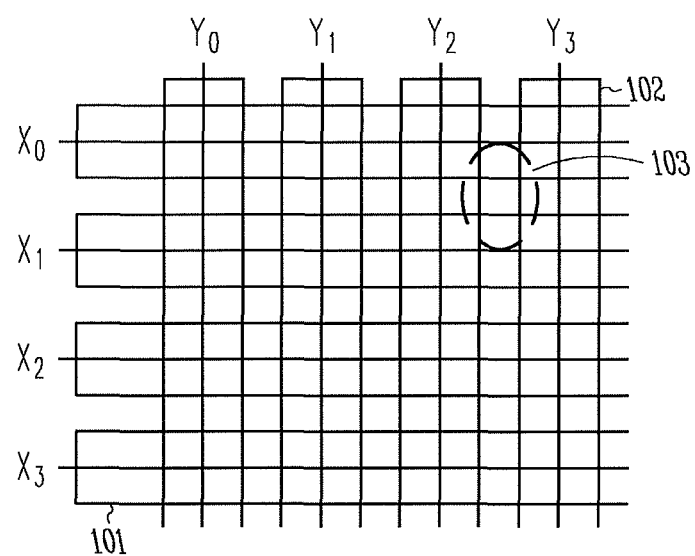
FIG. 1 shows a two-layer mutual capacitance touchscreen assembly, consistent with the prior art.

An example touchscreen shown in FIG. 1 uses an array of conductive traces as touchscreen elements, having X drive and Y receive lines in different layers when operated in a mutual capacitance mode. In self-capacitance operation, the self capacitance of the X and Y electrodes are independently determined to determine the position of the finger in two dimensions. The elements in this example are distributed across the touchscreen display approximately evenly, and are divided into different zones 0-3 for both the X drive and Y receive lines. In a more detailed mutual capacitance example, four different drive signals X0-X3 drive the four separate arrays of horizontal X drive lines, as shown generally at 101. The signals driving these lines capacitively couple with the vertical receive lines Y0-Y3, shown at 102. When a finger 103 touches the touchscreen, the finger desirably interacts with several X drive lines, intersecting the X0 and X1 drive lines such that the finger's position on the touchscreen can be determined by the degree of interference with capacitive coupling of each drive and receive zone.

In this example, the finger 103 interferes with capacitive coupling between the X0 and X1 drive lines and the receive lines approximately equally, and similarly interferes with the capacitive coupling between the Y2 and Y3 receive lines and the X drive lines approximately equally. This indicates that the finger's touch is located between X0 and X1, and between Y2 and Y3 on the grid formed by the drive and receive lines.

Although each zone in this example comprises multiple electrodes, in other examples each zone may have a single electrode, at the cost of a greater number of electrical connections to the touchscreen. The touchscreen display of FIG. 1 is here shown having four different vertical regions and four different horizontal regions, but other embodiments such as a typical computer or smart phone application may have significantly more zones than shown in this example.

Because the finger touch 103 is somewhat round or oval in shape, it will interact more strongly with drive lines near the center of the finger than at either the top or bottom extreme edge of the fingerprint. Further, the finger will interact to a lesser degree with adjacent drive and receive lines not directly under the area of physical contact between the finger and the screen's protective layers, where the finger is still physically near enough the drive and receive lines to interact with their capacitive coupling.

The finger's influence on multiple drive and receive lines enables the touchscreen display to detect the vertical and horizontal position of a finger on the touchscreen display with very good accuracy, well beyond simply determining in which of the four shown vertical and horizontal regions the finger is located. To achieve this result, the line spacing here is configured anticipating a fingerprint that is approximately 8 mm in diameter. In this example, the lines are spaced approximately 2 mm apart, for a 6 mm electrode pitch, such that a typical touch interacts strongly with at least three or four vertical and horizontal lines.

In operation, a user of the touchscreen display of FIG. 1 places a finger on or near the touchscreen as shown at 103. In mutual capacitance mode, series of pulses are sent via the X0-X4 drive lines, such that the mutual capacitance between the different X drive lines and Y receive lines can be separately determined, such as by observation of a change in received charge or another suitable method. When the presence of a finger interrupts the field between the X and Y drive and receive lines, such as by coming in close proximity to a portion of the touchscreen, a reduction in observed field coupling between the electrodes is observed.

The distribution of lines across the touchscreen display is also generally uniform, resulting in relatively uniform brightness across the touchscreen display. But, the regular pattern and spacing of lines such as in FIG. 1 can cause interference with the regular, repeating pixel pattern of a display, causing visible moiré patterns that distort or reduce the clarity of an underlying displayed image.

Configuration of touchscreen elements relative to the line or pixel configuration of a display assembly is therefore important in some applications to reduce moiré patterns, as line configurations that cover regular or repeating patterns of pixels can create interference or moiré patterns in the touchscreen display assembly. It is therefore desirable in some embodiments to configure electrodes in an embodiment such as that of FIG. 1 to be irregular or at angles that do not cause such interference with the underlying display assembly.

The line configuration in touchscreen displays in some example embodiments of the invention is determined to avoid creating interference or moiré patterns as a result of the line geometry interacting with the pixel geometry of the display. For example, lines that are very near but slightly offset from a line angle of the display, such as one degree, are likely to produce interference patterns. Similarly, right angles or fractions thereof such as 90 degree angles, 45 degree angles, and 22.5 degree angles may also be more likely to produce moiré patterns depending on the configuration of the display elements and the line pitch of the touchscreen element.

Figure 2:
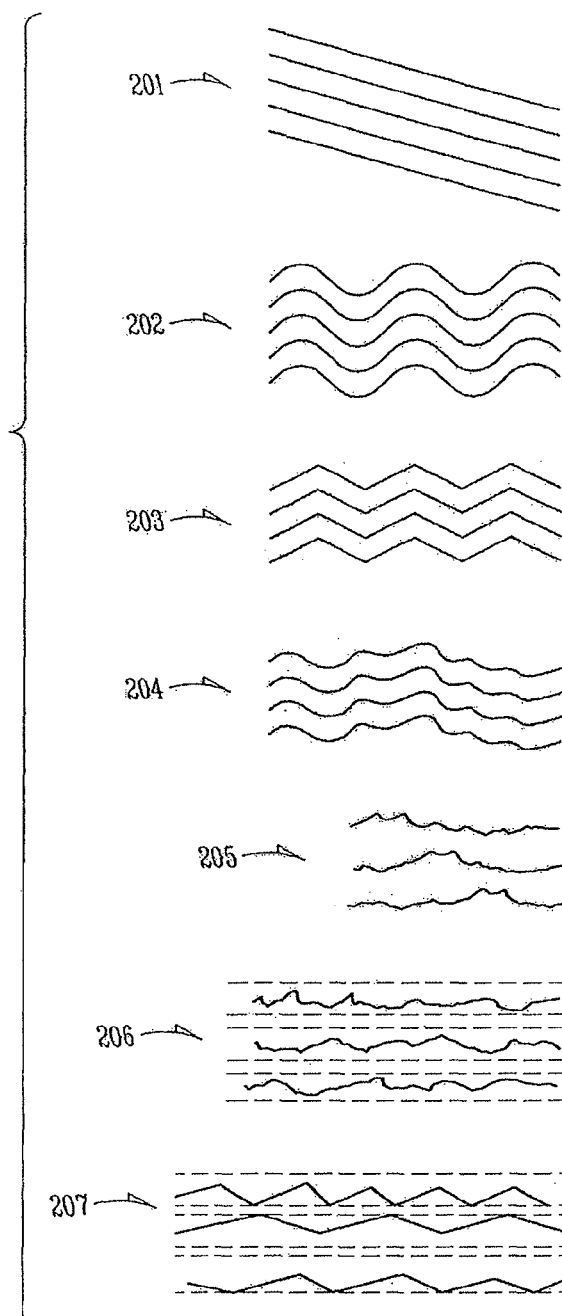
FIG. 2 illustrates a variety of touchscreen element patterns designed to reduce moiré effect when overlaying a display, consistent with an example embodiment.

FIG. 2 shows several examples of touchscreen elements configured to reduce or eliminate interference patterns, consistent with various example touchscreen embodiments. Touchscreen elements such as these can be substituted for the straight fine line metal elements of FIG. 1, reducing moiré pattern visibility in a touchscreen assembly.

At 201, the lines are configured at an angle rather than square to an edge of the touchscreen display assembly and LCD display, reducing the likelihood of interference patterns. At 202, wavy lines are used to avoid long linear stretches of fine metal line, reducing the probability of causing interference patterns. Similarly, the fine metal lines at 203 zig-zag, breaking up long linear stretches of parallel lines. At 204, the lines follow a randomized pattern, and so also lack long linear portions. A randomized electrode pattern is also shown at 205, but the randomized electrode line is shifted laterally from line to line to break up vertical regularity in the electrode pattern; the amount of shifting from line to line can in itself be randomized to further suppress the ability of groups of lines to cause a moiré effect. Fractal-based or other irregular shapes are used in further embodiments to achieve a similar effect.

Although angled and wavy lines are used here to avoid creating moiré patterns, a variety of factors other than angle or direction of the lines will affect the likelihood of observing a moiré pattern when overlaying a display with a touchscreen assembly, including touchscreen element or electrode line width, frequency, and scale. In some embodiments, the touchscreen elements are formed using fine line metal on the order of 3-7 micrometers in width, which is much smaller than the typical pixel size of even high resolution LCD displays.

A high resolution LCD display pixel is typically made up of three individual red, green, and blue sub-pixels that are 100-150 micrometers in diameter, or 0.1-0.15 millimeters. This large difference in scale reduces the amount that a line can overlap a pixel, limiting the amount the pixel's apparent brightness can be attenuated by the overlapping touchscreen. Because the difference between sub-pixels obscured by overlapping touchscreen lines and sub-pixels not obscured by touchscreen element lines is small, the chances of creating a visible moiré pattern are greatly reduced. For example, a line that is only 5 micrometers wide cannot substantially obscure an LCD color sub-pixel that is 100 micrometers in diameter, resulting in little difference in visible brightness when the touchscreen element line overlaps a sub-pixel of the underlying display. Nevertheless, even a high pixel-to-line dimension ratio touchscreen can exhibit subtle moiré banding effects under the right conditions, which might be objectionable.

The frequency or density of touchscreen lines is further a factor in production of moiré patterns, as greater spacing between lines or greater differences in pitch between overlapping patterns generally tend to reduce likelihood of producing visible moiré patterns. Returning to the example of FIG. 1, the example fingerprint 103 of approximately 8 mm covers approximately four lines, resulting in a line pitch of approximately 2 mm between each line. When using fine line metal touchscreen element electrodes that are 5 micrometers in width, the distance between lines is approximately 400 times the width of the lines, resulting in a very low line density and a relatively large width from line to line. Both the low density and relatively large spacing between lines reduce the likelihood of producing visible moiré patterns when overlaying a display having a regularly repeating pixel configuration. In other examples, the line spacing is at least 20, 50, 100, or 150 times greater than the line width.

The wavy and zig-zag lines in the examples shown include some repetition in configuration of the lines, such as repeatedly going up and down in the same pattern. The degree of repetition between adjacent lines is varied in a further example, to further reduce the chances of creating regular, repeating patterns that can contribute to moiré effects. A group of line elements such as 10, 20, 50, or some other suitable number of lines is repeated in some embodiments to form larger touchscreens, reducing the work needed to lay out larger touchscreens having large numbers of touchscreen electrode elements. Repetition of randomized lines can be used where the repeated lines are sufficiently far apart or have a sufficient number of non-repeating intervening lines as to be unlikely to contribute to moiré patterns, such as repeating every 10 or 20 lines. A designer can therefore use a standard block of 20 random lines and repeatedly use the same 20 lines to produce a large touchscreen element array such as in FIG. 1, avoiding the need to manually generate a large number of random lines for each application.

In some further examples, the scale of the line pattern is also taken into consideration, such that the scale of repetition of the pixels of the underlying display is on a much smaller scale than the repetition of the anti-moiré touchscreen element pattern. For example, green sub-pixels on a touchscreen display may repeat every 100 microns, while the wavy line touchscreen electrode overlay repeats its pattern every 5 millimeters. This difference in scale greatly reduces the chances of observing a moiré pattern, especially where the electrode line size is small relative to the display's pixel size.

In other examples, the lines are random or semi-random in path, such as fractal-type lines shown at 204. These lines can be produced using a variety of methods including random number generation, use of fractal algorithms, or can be drawn by hand.

Because it is desirable to keep adjacent lines from overlapping, and to know the approximate position of the line for determining touch position, line position in a further embodiment is restricted to a certain band or range. This can be achieved in a number of ways, such as simply setting upper and lower bounds for a randomization process, normalizing a generated line to fit within a certain band, changing the probability of the next change in line direction based on line position within a band to encourage reversion to a desired mean path, and other methods. FIG. 2 shows at 206 an example of separately randomized electrode lines that are constrained within a certain band or range.

In addition to line direction, spacing between lines and repetition of lines can also be varied to reduce the regularity of the fine line metal touchscreen element array, reducing the chances for observing moiré patterns. If the spacing between lines is varied, whether with random lines such as fractal lines or repeating lines such as wavy lines, the lines will be significantly less likely to form regular repeating patterns of obscuring pixels on an underlying display, reducing the chances of moiré patterns being formed. As with randomizing line direction, variation in line spacing can be achieved using a number of suitable techniques including randomization within a range, normalization of random numbers to a desired range, and other methods. Use of line constraints such as boundaries is again important in randomizing line spacing to ensure that adjacent lines, such as the X drive lines and Y receive lines of FIG. 1, do not come too close or touch one another, thereby causing field nonlinearities. FIG. 2 shows at 207 one such example having variation of line position within a channel, and variation in frequency of repetition of line features.

Figure 3:
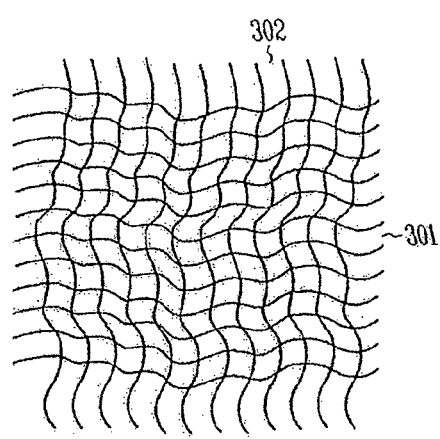
FIG. 3 illustrates a two-layer touchscreen assembly comprising randomized electrodes configured to reduce moiré effect when overlaying a display, consistent with an example embodiment.

FIG. 3 shows a two-layer touchscreen display assembly having randomized touchscreen element paths, such as is shown at 204 of FIG. 2. In this example, a first set of touchscreen elements 301 follow varying randomized paths so as to not form regular patterns of overlap with the pixels of an underlying display. Similarly, a second set of touchscreen elements 302 also follow varying randomized paths to avoid creating moiré patterns with the underlying display's pixels.

The lines 301 and 302 form a two-layer mutual capacitance touchscreen array of drive and receive electrodes in a further example embodiment, much like the example of FIG. 1, but with significantly improved immunity to creation of moiré patterns. In an alternate embodiment, the array of lines 301 and 302 form a self-capacitance touchscreen array, in which the self capacitance of the lines 301 and 302 are used to determine the position of a touch on the two-dimensional touchscreen As shown in the above examples, use of touchscreen electrode elements having complex or irregular patterns, irregular spacing, and other variations can reduce moiré effect when the touchscreen overlays a display assembly having a regular repeating pattern of pixel elements. The examples of FIG. 2 can be easily applied to various touchscreen embodiments, such as the mutual capacitance and self capacitance touchscreen examples presented above, as well as other touchscreen embodiments such as single-layer touchscreens.

Figure 4:
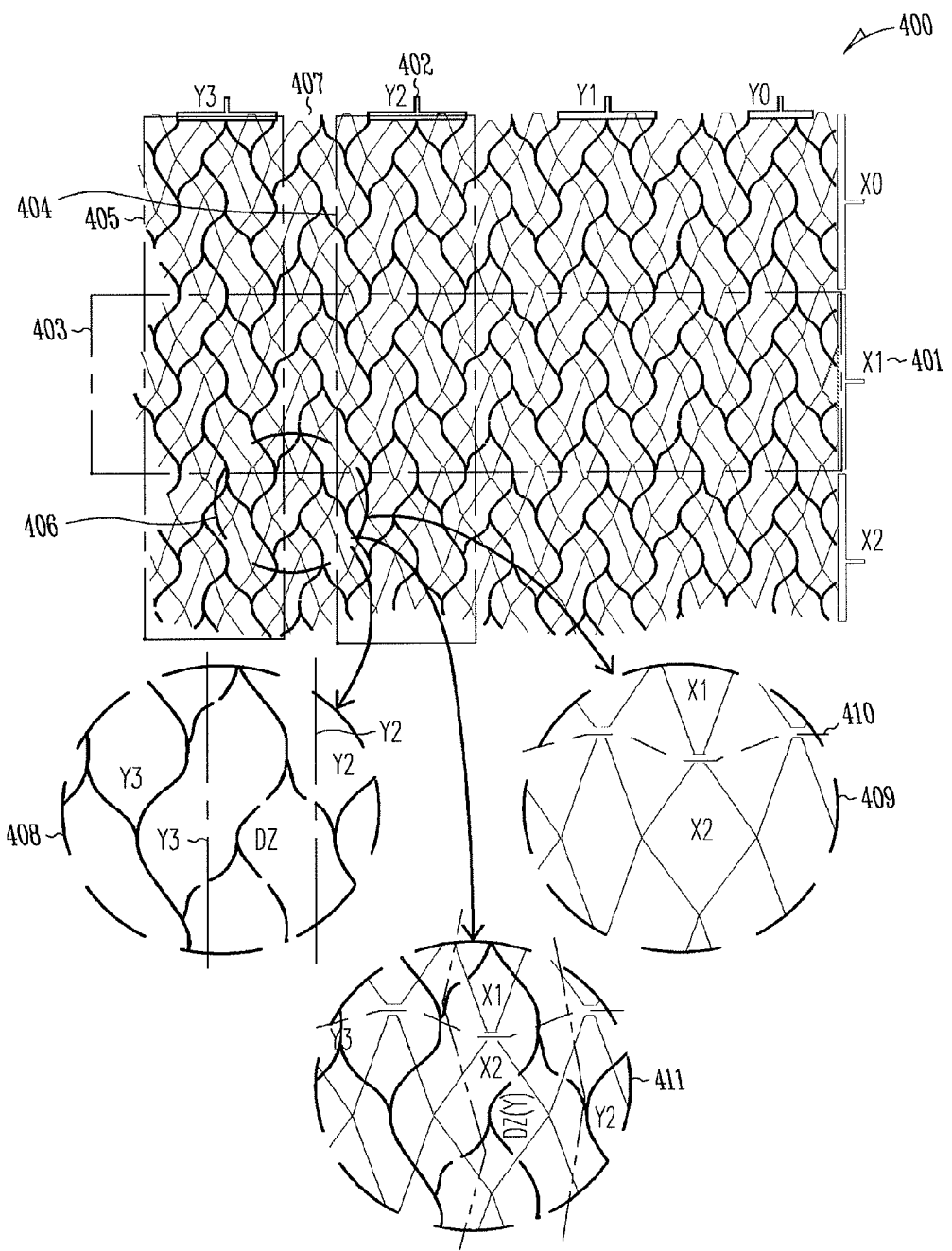
FIG. 4 shows a two-layer touchscreen display assembly comprising overlapping drive and receive mesh electrode patterns configured to reduce moiré effect when overlaying a display, consistent with an example embodiment.

FIG. 4 shows an arrangement of electrodes configured to form a touchscreen display, including overlapping mesh-like arrays of electrodes. Here, a first array of electrodes 401 are overlaid with a second array of electrodes 402, such that the electrodes follow irregular paths configured to avoid creating moiré patterns when overlaying a display. Although the electrodes are formed on different layers here, similar arrangements are used in other embodiments to form single layer touchscreen assemblies.

The touchscreen configuration shown here can be operated in one example as a mutual capacitance touchscreen, such as where the X lines are drive lines and the Y lines are receive lines. In another example, the X and Y lines are operated independently as self-capacitance electrodes.

In this example, the horizontal electrodes coupled to the X1 connection are shown within the area of region 403, and the vertical electrodes coupled to the Y2 connection are shown within region 404. Region 405 similarly shows the vertical electrodes coupled to connection Y3, and a section of the touchscreen display that overlaps these drive and receive segments is shown at 406. A "dead zone" of vertical electrodes not coupled to a vertical external connection are shown at 407 (denoted DZ), and are optionally included in various configurations in order to provide improved linearity. As shown in the magnified vertical electrode view at 408, the vertical dead zone Y electrode between the Y2 and Y3 receive electrode regions is broken up in the vertical direction to prevent propagation of fields along the electrode axis, ensuring linear response of the touchscreen assembly.

The magnified vertical Y electrode view at 408 also illustrates how the Y receive electrodes are formed in a mesh having a continuous pattern of wavy lines that are interconnected with wavy line segments, with breaks that separate the Y2 and Y3 electrode zones from the dead zone (DZ) electrode 407. These breaks are staggered here, to break up the regularity of separation between zones and prevent moiré patterns. The Y layer electrodes are formed of a series of curves, but in other embodiments are formed of polygons or other patterns. The S-shaped curves forming the Y electrode pattern here further provide a degree of redundancy in current path through the electrode, as the lines are bridged at regular intervals by crossing S-shaped curves to form the mesh shown.

The Y electrode pattern shown in the magnified section shown at 408 is overlaid in this example by the X electrode pattern shown at 409. The X electrode pattern includes an array of mixed parallelograms forming a horizontal electrode mesh, with breaks between zones formed by truncating ends of parallelograms and bridging the truncated parallelograms as shown at 410. Bridging the truncated parallelograms here prevents an open-ended line segment, providing greater conductivity and a redundant path for an undesired break or defect in the parallelograms. Further, vertices in the irregular parallelograms pattern shown at 409 are not in a straight line due to the variation in electrode element angle and mixed parallelogram shapes. Breaks between parallelograms at their vertices to form the breaks between zones therefore vary in position as shown at 410, reducing the chances of moiré effect and providing some degree of interpolative effect between zones.

Different shapes and shape variations may be used to form the mixed parallelogram array depending on the requirements of a particular application, for example pixel pitch, electrode spacing, required line density, and so on. Use of line elements having fewer than four different angles, such as a regular checkerboard pattern, can be used in some examples but may contribute to a greater likelihood of producing a moiré effect. It has been shown that a mix of parallelograms has the potential advantage of having many non-orthogonal line angles while being readily scaleable in density and pitch. Other shapes, such various types of polygons, curves, random or semi-random lines, and other such electrodes can be used in addition to the parallelograms shown, including in various combinations, and are within the scope of the invention.

The electrodes shown at 408 and 409 are overlaid in the enlarged view shown at 411, illustrating how the two electrode patterns are layered together with electrical isolation between them (not shown) to form a pattern of electrodes as shown generally in FIG. 4 at 400. The X electrode polygons and the Y electrode S-curves are configured to form meshes with elements that have the same pitch, and repeat at the same frequency in both dimensions. This enables the intersections of polygons in the X electrode layer to be placed in the open spaces formed by the S-curves of the Y electrode pattern, and the intersections between s-curves of the Y electrode pattern are located in the open spaces formed by the polygons of the X electrode layer.

Further, the many crossovers between X electrodes and Y electrode traces or wires when overlaid and viewed from above are approximately orthogonal, reducing the change in sensitivity of the touchscreen to small alignment changes or imperfections in the layer-to-layer assembly process. Oblique angles can cause pattern displacement errors during assembly which can cause substantial field nonlinearities, and so it is desirable to reduce this form of error. In various further examples, the crossover angle between drive and receive elements is desirably at least 45 degrees, 60 degrees, or another suitable angle to manage the sensitivity of the touchscreen to pattern alignment.

Fine line patterns exhibit localized field fluctuations due to pattern granularity, which apart from layer to layer alignment errors causes regional fluctuations in sensitivity. It is desirable to align these fluctuations in a regular way, synchronized if possible with electrode centerlines. The electrode pattern here is configured such that the pitch of the electrode connections such as Y1 and Y2 align with the pitch of repetition of the Y mesh, and the pitch of the electrode connections X1 and X2 align with the pitch of the X electrode mesh. The meshes in each layer are thus repeating along each axis, in synchronicity with the electrode centers. This ensures that the electrode mesh's relation to the electrode connections is the same at each electrode connection, providing good linearity in geometry and response between electrode regions.

Construction of the touchscreen example of FIG. 4 in one example includes fabrication of the X and Y electrode layers on separate plastic sheets, and lamination of the sheets under a cover lens. In another example, the X and Y layers are fabricated on the same plastic sheet or other substrate, with a dielectric material printed or deposited at the crossover points between electrodes to prevent conduction between X and Y layers.

The X drive and Y receive layers in FIG. 4 can be easily reversed, so that either of the X or Y layer is the drive or receive layer, with no significant change in the performance of the touchscreen assembly. In another example, the same pattern or mesh is used for the X and Y layers, such as using S-curves for both the X and Y layers or using polygons for both the X and Y layers. The net effect of any such configuration is that a touchscreen electrode pattern with no apparent moiré effect is provided.

In various touchscreen configurations, the electrodes of FIG. 1 are made of various materials such as indium tin oxide, conductive polymer, or narrow metal lines. Fine metal wires in a more detailed example comprise printed metal traces that are approximately 10 micrometers or less in width, or another similar suitable size such as under 20 micrometers or under 5 micrometers in width. A more detailed example includes fine line metal lines that are approximately 10 micrometers in width, and occupy 3-7% of the total screen area. The very small line width enables placement of many lines per millimeter in some embodiments, as the total line density can in various embodiments cover a fraction of a percent to 10% of the total screen area without significantly impacting the visibility of an image through the touchscreen.

Figure 5:
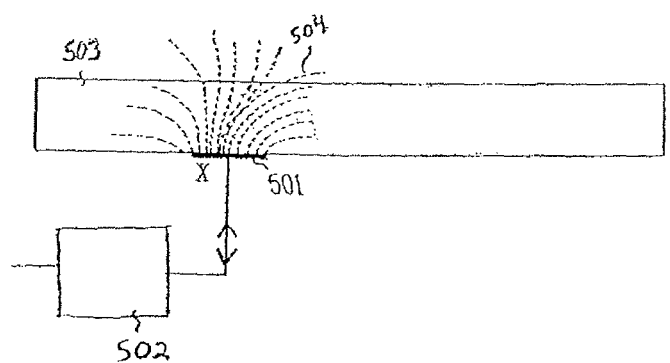
FIG. 5 shows a self capacitance touch sensing system, consistent with an example embodiment.

FIG. 5 shows the field lines associated with an electrode with self-capacitive coupling. Here, field lines extend from an electrode line 501 (shown as X) operated by a circuit 502, the fields penetrating through panel 503. A portion of the emitted field 504 escapes into free space or other parts of the panel as shown, and capacitively couples with a finger when present. The circuit 502 observes a change in self-capacitance of electrode 501 due to the presence of a finger near field lines 504, such as by observing a greater charge is needed to change the voltage of the electrode 501. A great many forms of capacitive sensor circuit exist in the art and are well known, which can be used for circuit 502.

Figure 6:
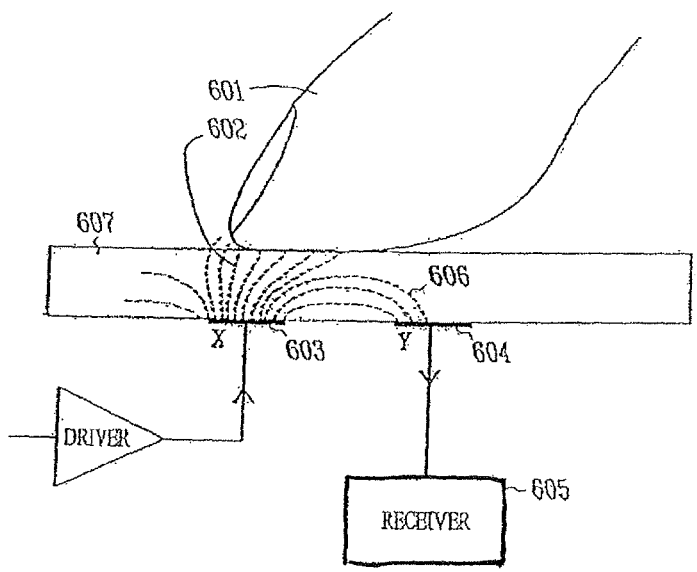
FIG. 6 shows a mutual capacitance touch sensing system with a finger present, consistent with an example embodiment.

FIG. 6 shows an electrode configuration with mutual capacitive coupling. Here, a finger 601 causes field lines 602 normally coupling from drive electrode 603 to receive electrode 604 as shown at 606 to be absorbed by the finger 601. The result of this action is a very detectable decrease in signal level by receiver 605, the reduction in signal being related to a variety of factors such as fingerprint area, electrode area, panel 607 thickness and dielectric constant, human body size and location, skin thickness and conductivity, and other factors.

Figure 7:
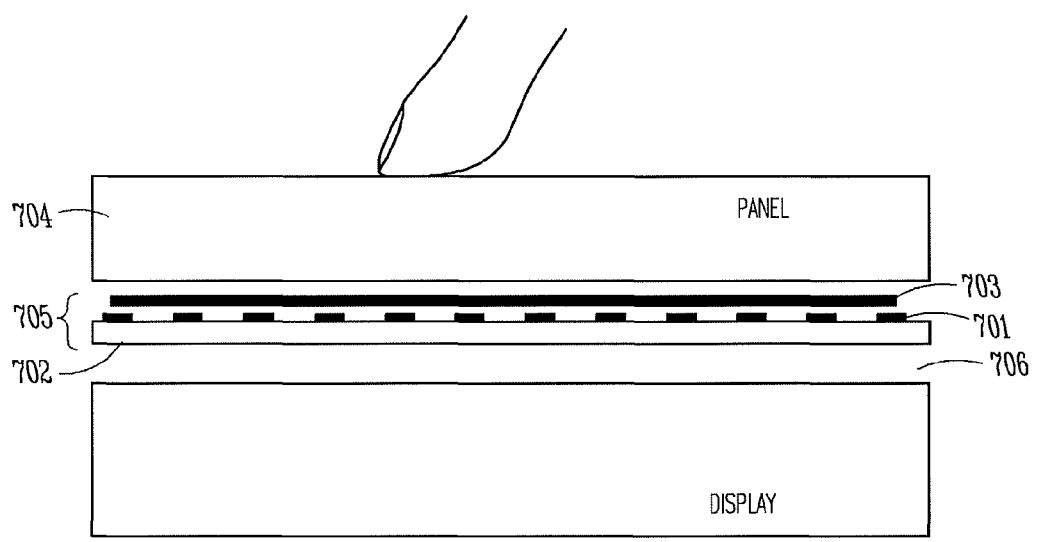
FIG. 7 shows a single layer touchscreen assembly overlaying a LCD display panel according to an example embodiment.

FIG. 7 shows one physical implementation of a single electrode layer stack over a display such as an LCD. The electrodes 701 are printed or otherwise fashioned onto a substrate 702, which in some embodiments is a clear plastic sheet such as PET or polycarbonate, or potentially a glass layer. Adhesive 703 is used to bond substrate layer 702 to panel 704; adhesive 703 is in some embodiments a liquid adhesive, or an adhesive sheet. Assembly may be via a laminating process to provide for an airtight assembly. Electrodes 701 may be fashioned from clear ITO, fine line metal traces, or other low visibility conductive material when used with a display. If no display is used, then the optical properties of assembly 705 are not relevant and any set of suitable materials may be used. Gap 706 is an airgap between the display and the assembly 705, as is common in the art. In some cases it is advantageous to insert an adhesive layer in this gap and laminate the entire stack to the top of the display.

Figure 8:
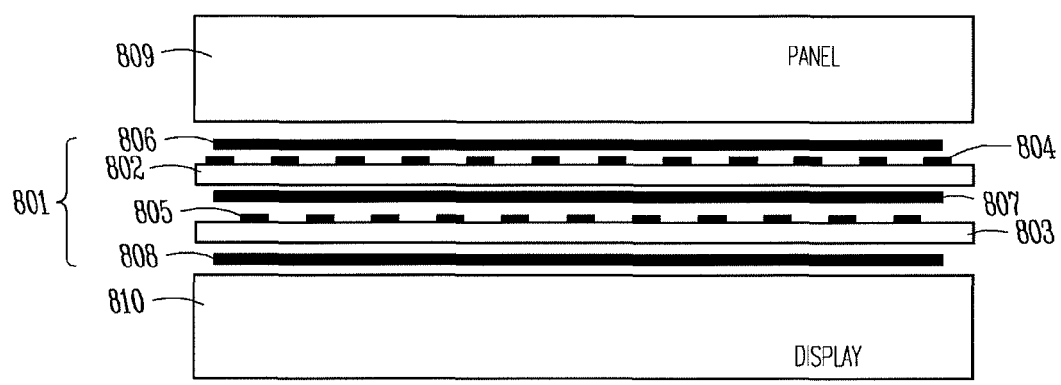
FIG. 8 shows an exploded view of a dual layer touchscreen assembly overlaying a LCD display panel according to an example embodiment.

FIG. 8 shows an assembly stack 801 which contains two sensing layers, for example as may be used to implement the design of FIG. 4. Two layers of plastic film are used, 802 and 803, with respective electrodes 804 and 805 fashioned thereon, and assembled with adhesive layers 806, 807 and optionally 808 via a lamination process to panel 809 and possibly also to display 810.

Figure 9:
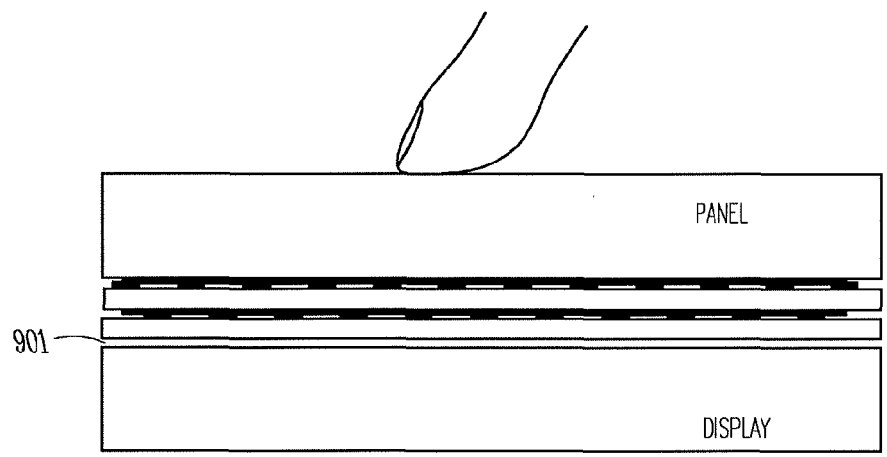
FIG. 9 shows the assembled dual layer touchscreen assembly of FIG. 8 according to an example embodiment.

FIG. 9 shows the layer stack of FIG. 8 as laminated together, but without the adhesive layer 808, using instead an airgap 901.

Figure 10:
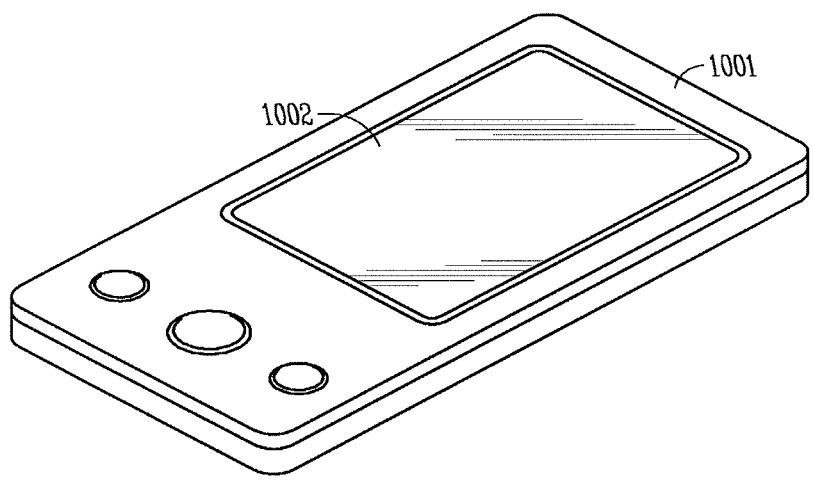
FIG. 10 shows a cellular telephone having a touchscreen display according to an example embodiment.

Touchscreens are often used in a variety of applications, from automatic teller machines (ATM machines), home appliances, personal digital assistants and cell phones, and other such devices. One such example cellular telephone or PDA device is illustrated in FIG. 10. Here, the cellular telephone device 1001 includes a touchscreen display 1002 comprising a significant portion of the largest surface of the device. The large size of the touchscreen 1002 enables the touchscreen to present a wide variety of images that can serve along with touchscreen capability to provide input to the device, including a keyboard, a numeric keypad, program or application icons, and various other interfaces as desired.

The user may interact with the device by touching with a single finger, such as to select a program for execution or to type a letter on a keyboard displayed on the touchscreen display assembly 1002, or may use multiple touches such as to zoom in or zoom out when viewing a document or image. In other devices, such as home appliances, the display does not change or changes only slightly during device operation, and may recognize only single touches.

Although the example touchscreen display of FIG. 10 is configured as a rectangular grid, other configurations are possible and are within the scope of the invention, such as a touchwheel, a linear slider, buttons with reconfigurable displays, and other such configurations. Proportionate distribution of drive or receive electrodes coupled to different elements across the touchscreen element can be adapted to any such shape, enabling detection of the region of input on the touchscreen.

Many materials and configurations will be suitable for forming touchscreens such as those described herein, including printed or etched fine line metal, metal wire, Indium tin oxide (ITO), conductive polymers, and other such materials.

These example touchscreen assemblies presented here illustrate how a touchscreen can be formed using electrodes configured to reduce the probability of creating a visible moiré pattern when overlaying a display having a repeating pattern of pixels. Although the anti-moiré touchscreen display assembly examples given here generally rely on mutual capacitance or self-capacitance to operate, other embodiments of the invention will use other technologies, including other capacitance measures, resistance, or other such sense technologies. This application is intended to cover any adaptations or variations of the example embodiments described herein, and this invention is limited only by the claims, and the full scope of equivalents thereof.

The invention claimed is:

1. An assembly, comprising:
   a plurality of first touchscreen electrodes distributed across at least an active area of a substrate, each first touchscreen electrode of the plurality of first touchscreen electrodes comprising a first mesh of conductive lines having a first pattern; and
   a plurality of second touchscreen electrodes distributed across at least an active area of a substrate and overlapping the plurality of first touchscreen electrodes, each second touchscreen electrode of the plurality of second touchscreen electrodes comprising a second mesh of conductive lines having a second pattern, the second pattern of the second mesh of conductive lines being different than the first pattern of the first mesh of conductive lines, one or more of the first pattern of the first mesh and the second pattern of the second mesh comprises irregular shapes;
   the first mesh of the plurality of first touchscreen electrodes and the second mesh of the plurality of second touchscreen electrodes being configured such that mesh intersections formed by the conductive lines of the first mesh having the first pattern occur in open spaces formed by the conductive lines of the second mesh having the second pattern that is different than the first pattern and mesh intersections formed by the conductive lines of the second mesh having the second pattern that is different than the first pattern occur in open spaces formed by the conductive lines of the first mesh having the first pattern.

2. The assembly of claim 1, wherein one or more of the conductive lines of the first mesh of the plurality of first touchscreen electrodes and the conductive lines of the second mesh of the plurality of second touchscreen electrodes form a mesh comprising one or more of:
polygons;
s-curves; and
random curves.

3. The assembly of claim 1, wherein one or more of the first mesh of the plurality of first touchscreen electrodes and the second mesh of the plurality of second touchscreen electrodes is broken along one or more zone edges to create multiple electrically separate zones.

4. The assembly of claim 1, wherein the conductive lines of the first mesh of the plurality of first touchscreen electrodes and the conductive lines of the second mesh of the plurality of second touchscreen electrodes comprise fine lines of metal of 10 or less micrometers in width.

5. The assembly of claim 1, wherein the first mesh of the plurality of first touchscreen electrodes and the second mesh of the plurality of second touchscreen electrodes each comprise one or more of:
angled conductive lines;
wavy conductive lines;
zig-zag conductive lines; and
randomized conductive lines.

6. The assembly of claim 1, wherein the conductive lines of the first mesh of the plurality of first touchscreen electrodes and the conductive lines of the second mesh of the plurality of second touchscreen electrodes have a line width 1/10 or less a sub-pixel size of the display.

7. The assembly of claim 1, wherein a spacing between one or more of the conductive lines of the first mesh of the plurality of first touchscreen electrodes and the conductive lines of the second mesh of the plurality of second touchscreen electrodes is randomized.

8. The assembly of claim 1, wherein a distance between one or more of the conductive lines of the first mesh of the plurality of first touchscreen electrodes and the conductive lines of the second mesh of the plurality of second touchscreen electrodes is at least 50 times the width of the lines.

9. The assembly of claim 1, wherein:
the substrate across which the plurality of first touchscreen electrodes is distributed and the substrate across which the plurality of second touchscreen electrodes is distributed is the same substrate;
the plurality of first touchscreen electrodes is formed on a first side of the substrate; and
the plurality of second touchscreen electrodes is formed on a second side of the substrate that is opposite the first side of the substrate.

10. The assembly of claim 1, wherein:
the substrate across which the plurality of first touchscreen electrodes is distributed is a first substrate; and the substrate across which the plurality of second touchscreen electrodes is distributed is a second substrate, the second substrate being distinct from the first substrate.

11. The assembly of claim 1, wherein one or more of the first pattern and the second pattern comprises a plurality of straight-line segments.

12. The assembly of claim 1, wherein the first pattern of the first mesh comprises shapes formed by the conductive lines of the first mesh, the shapes defining the open areas of the first mesh.

13. The assembly of claim 1, wherein, for a series of first, second, and third vertices in the first mesh, a path from the first vertex in the first mesh to the third vertex in the first mesh does not follow a straight line.

14. The assembly of claim 1, wherein the first mesh comprises at least four different angles formed by intersections of the conductive lines of the first mesh.

15. The assembly of claim 1, wherein:
at least one of the first and second patterns comprises a series of wavy lines; and
the other of the first and second patterns comprises a plurality straight line segments forming a plurality of polygons.

16. A method, comprising:
forming a plurality of first touchscreen electrodes distributed across at least an active area of a substrate, each first touchscreen electrode of the plurality of first touchscreen electrodes comprising a first mesh of conductive lines having a first pattern; and
forming a plurality of second touchscreen electrodes distributed across at least an active area of a substrate and overlapping the plurality of first touchscreen electrodes, each second touchscreen electrode of the plurality of second touchscreen electrodes comprising a second mesh of conductive lines having a second pattern, the second pattern of the second mesh of conductive lines being different than the first pattern of the first mesh of conductive lines, one or more of the first pattern of the first mesh and the second pattern of the second mesh comprises irregular shapes;
the first mesh of the plurality of first touchscreen electrodes and the second mesh of the plurality of second touchscreen electrodes being configured such that mesh intersections formed by the conductive lines of the first mesh having the first pattern occur in open spaces formed by the conductive lines of the second mesh having the second pattern that is different than the first pattern and mesh intersections formed by the conductive lines of the second mesh having the second pattern that is different than the first pattern occur in open spaces formed by the conductive lines of the first mesh having the first pattern.

17. An electronic device, comprising:
a display having a pattern of regularly repeating pixels; and
a touchscreen overlaying the display and comprising:
a plurality of first touchscreen electrodes distributed across at least an active area of a substrate, each first touchscreen electrode of the plurality of first touchscreen electrodes comprising a first mesh of conductive lines having a first pattern; and
a plurality of second touchscreen electrodes distributed across at least an active area of a substrate and overlapping the plurality of first touchscreen electrodes, each second touchscreen electrode of the plurality of second touchscreen electrodes comprising a second mesh of conductive lines having a second pattern, the second pattern of the second mesh of conductive lines being different than the first pattern of the first mesh of conductive lines, one or more of the first pattern of the first mesh and the second pattern of the second mesh comprises irregular shapes;

the first mesh of the plurality of first touchscreen electrodes and the second mesh of the plurality of second touchscreen electrodes being configured such that mesh intersections formed by the conductive lines of the first mesh having the first pattern occur in open spaces formed by the conductive lines of the second mesh having the second pattern that is different than the first pattern and mesh intersections formed by the conductive lines of the second mesh having the second pattern that is different than the first pattern occur in open spaces formed by the conductive lines of the first mesh having the first pattern.

18. The electronic device of claim 17, wherein the device comprises one or more of a cellular telephone, a personal digital assistant, an appliance, a computer, an automatic teller machine, and a kiosk.

19. The electronic device of claim 17, wherein the first mesh of the plurality of first touchscreen electrodes and the second mesh of the plurality of second touchscreen electrodes each comprise one or more of:

angled conductive lines;

wavy conductive lines;

zig-zag conductive lines; and randomized conductive lines.

20. The electronic device of claim 17, wherein one or more of the conductive lines of the first mesh of the plurality of first touchscreen electrodes and the conductive lines of the second mesh of the plurality of second touchscreen electrodes form a mesh comprising one or more of:

polygons;

s-curves; and random curves.

* * * * *